United States Patent [19]

Ozawa

[11] Patent Number: 4,725,130
[45] Date of Patent: Feb. 16, 1988

[54] ZOOM FINDER

[75] Inventor: Toshiro Ozawa, Kawasaki, Japan

[73] Assignee: Ricoh Company, Ltd., Tokyo, Japan

[21] Appl. No.: 841,839

[22] Filed: Mar. 20, 1986

[30] Foreign Application Priority Data

Mar. 20, 1985 [JP] Japan .................... 60-54231

[51] Int. Cl.⁴ .................. G02B 15/14; G02B 13/18
[52] U.S. Cl. ........................ 350/427; 350/432
[58] Field of Search .................. 350/427, 432

[56] References Cited

U.S. PATENT DOCUMENTS 4,303,311 12/1981 Nakamura ............... 350/427

Primary Examiner—John K. Corbin
Assistant Examiner—Rebecca D. Gass
Attorney, Agent, or Firm—Oblon, Fisher, Spivak, McClelland & Maier

[57] ABSTRACT

A compact zoom finder suitable for compact cameras, video cameras and the like whose zoom ratio is about 2. While the zoom lens is composed of three units having positive, negative and positive refracting powers in order from an object side, the third unit is preferably composed of an ante-component having a negative refracting power and a post-component having a positive refracting power. In this case, an arrangement is made so that one surface in the ante-component of the third unit comprises a half mirror, and one surface in the post-component is provided with a frame to thereby provide for an albada finder.

14 Claims, 34 Drawing Figures

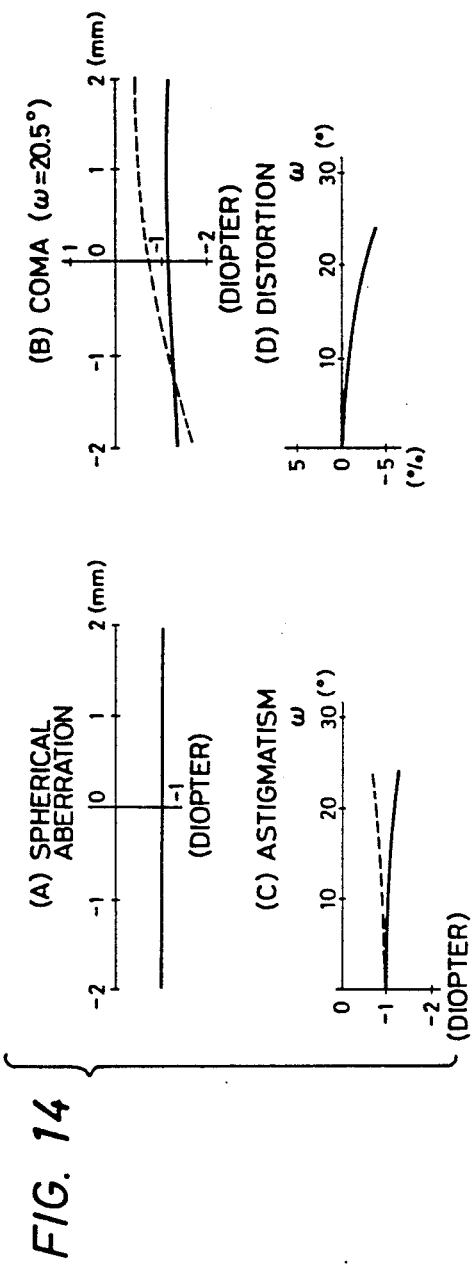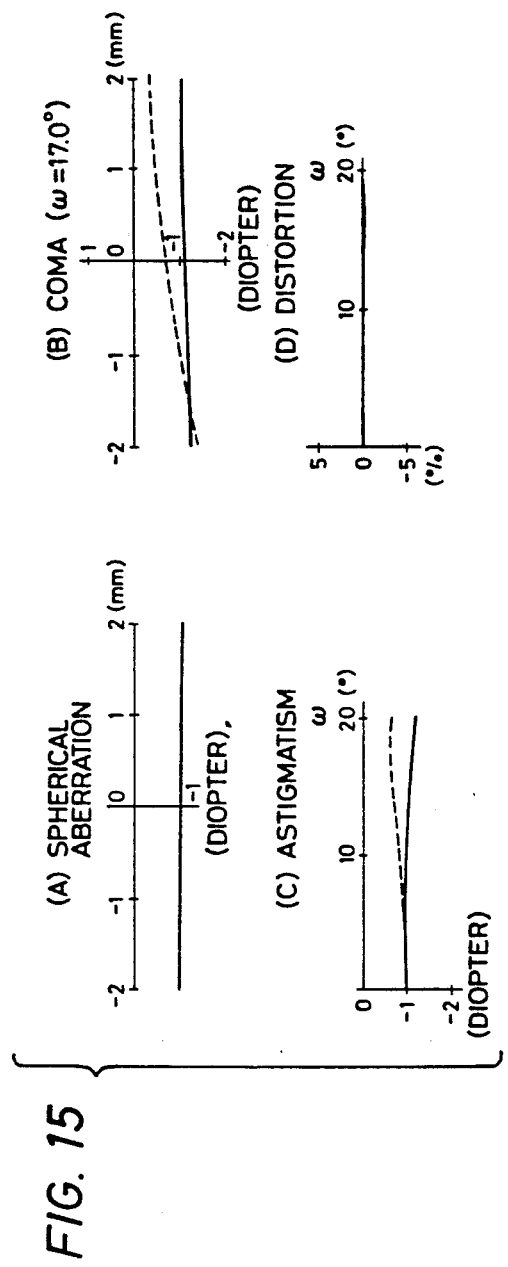

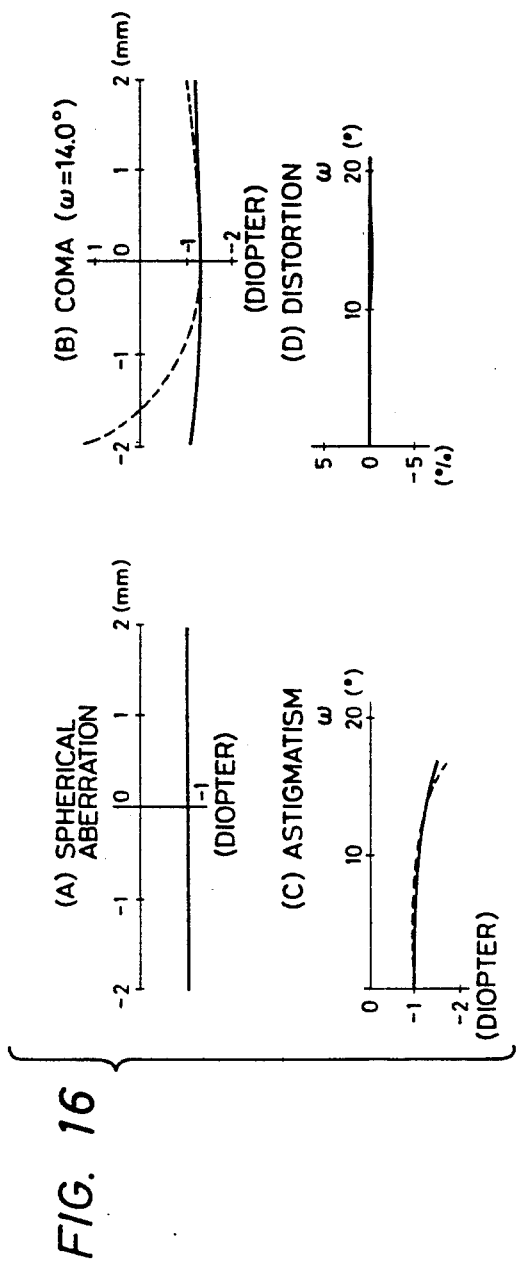
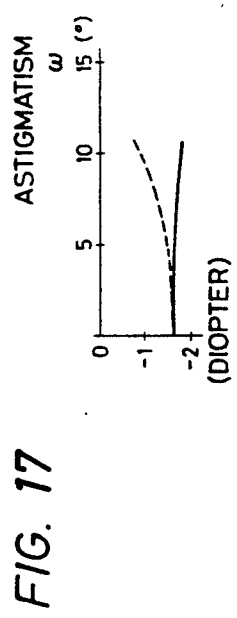
FIG. 16
FIG. 17

ZOOM FINDER

BACKGROUND OF THE INVENTION

1. Field of the Invention

This invention relates to a zoom finder, and more particularly to a compact zoom finder having a zoom ratio of approximately 2. 2. Description of the Prior Art A zoom finder whose zoom ratio is about 1.5 to 2.0 and maximum field angle is about 54° has been earnestly desired for use with a compact camera, a cine-camera and a VCR camera.

In the zoom finder, a diopter must be maintained constant simultaneously with the variation of magnification, and therefore three units have to be provided at a minumum. Known zoom types includes a positive-negative-positive type (Japanese Patent Publication No. 3024/52, and Japanese Patent Application Laid-Open No. 63014/78) including a first unit, a second unit and a third unit having a positive, a negative and a positive refracting power, respectively; and a negative-positive-negative type (Japanese Patent Publication No. 9389/58) including a first unit, a second unit and a third unit having a negative, a positive and a negative refracting power, respectively.

However, in the positive-negative-positive type, the out-of-axial light is incident as convergent rays upon the second unit from the first unit, as shown in FIG. 3(a), and therefore the effective diameter of the first unit lens increases and the aperture of the finder tends to increase. On the other hand, in the negative-positive-negative type, the out-of-axial light is incident as divergent rays upon the second unit from the first unit, as shown in FIG. 3(b), and therefore the effective diameter of the first unit lens is small and the aperture of the finder can be made to be smaller.

Therefore, for use with compact cameras or the like, the zoom finder of the negative-positive-negative type is advantageous. However, in the above-described known types, the maximum magnification of the finder is above 1, and the distance between the final surface of the lens and the pupil cannot be made sufficient and the correction of aberrations is not sufficient.

SUMMARY OF THE INVENTION

This invention utilizes the aforesaid characteristics with respect to the arrangement of refracting power of the negative, positive and negative to obtain a compact zoom finder which is small in overall length of the finder and small in the aperture of the finder.

In accordance with the present invention, there is provided a zoom finder including, in order from an object side, a first unit having a negative refracting power, a second unit having a positive refracting power and a third unit having a negative refracting power, wherein a space between the first unit and the second unit and a space between the second unit and the third unit are relatively varied to vary the magnification of a finder, the zoom finder being fulfilled by the following conditions:

$$Mmax < 1 \quad (1)$$

$$10 < f_2 < 20 \quad (2)$$

$$-10 < Dw < 10 \quad (3)$$

where,

Mmax: maximum magnification of the finder
$f_2$: focal length of the second unit in millimeter
Dw: space of the principal points between the second unit and the third unit at the minimum magnification of the finder.

More specifically, the lens construction preferably comprises, in order from an object side, a first unit having a negative lens $L_1$ and a negative lens $L_2$ with a surface having a sharp curvature faced to a pupil, and a second unit having a positive lens $L_3$ with a surface having a sharp curvature faced to a pupil and a positive lens $L_4$ with a surface having a sharp curvature faced to an object. Particularly, it is preferable that $r_1$ be the paraxial radius of curvature of the lens $L_1$ on the object side and $r_2$ be the paraxial radius of curvature on the pupil side, where the following is given:

$$r_2 < 0.4 |r_1| \quad (4)$$

and that $r_7$ be the paraxial radius of curvature of the surface of the second unit lens $L_4$ on the object side and $r_8$ be the paraxial radius of curvature of the surface on the pupil side, where the following is given:

$$r_7 < 0.4 |r_8| \quad (5)$$

The zoom finder fulfilled by the above-described conditions comprises spherical lenses and is sufficient to correct aberrations. However, where a nitric material or a plastic which has a low refractive index is used in an attempt to reduce cost or make the system compact, it is advantageous to introduce an aspherical surface.

Furthermore, it will be effective for compactness to have the third unit composed of an ante-component having a negative refracting power and a post-component having a positive refracting power. However, it will be advantageous in this case to constitute a so-called albada type frame system in which one surface in the ante-component comprises a half mirror and a frame is formed on one surface of the post-component.

As illustrated in FIG. 4, if an optical arrangement is provided in which the focal length $f_1$ of the first unit is negative, the focal length $f_2$ of the second unit is positive and the focal length $f_3$ of the third unit is negative; whereby an image, formed at a focal position P on the image side of the first unit upon the incidence of rays ($-\infty$) parallel to the optical axis, is focussed on a point Q by the second unit so that a focal point on the object side of the third unit is positioned at the point Q, then the emitted rays are parallel to the optical axis to provide a O-diopter finder.

At that time, the ratio between the incident height of paraxial rays and the emission height of paraxial rays, that is, the magnification M of the finder is given by:

$$M = -(f_1 m / f_3)$$

where, m represents the focussing magnification by the second group. Let $S(<O)$ be the distance from the second group to the point P and likewise let $S'(>O)$ be the distance to the point Q, the following is given:

$$m = S'/S$$

By continuously varying the value of m from the minimum magnification $m_w$ to the maximum magnification $m\gamma$ (here, $m\gamma < m_w < O$), the finder magnification of the entire system varies by $m\gamma/m_w$ times. Of course, if an arrangement is made so that only two values, $m_w$ and $m_T$ may be taken, this finder can be used as a 2-focal finder for a 2-focal photographic system.

Since S and S' may be represented by $$S = f_2(1/m - 1)$$

$$S' = f_2(1 - m)$$

by use of the focal length $f_2(>0)$ of the second unit, positions of points P and Q are represented as a parameter m as shown in FIG. 5, and positions of the first and third units are also indicated in FIG. 5. That is, the position of the first unit is closer to the second unit by the focal length $|f_1|$ of the first unit from the point P, and the position of the third unit is closer to the second unit by the focal length $|f_3|$ of the third unit from the point Q, and therefore, the space $D_1$ between the principal points of the first and second units and the space $D_2$ between the principal points of the second and third units are respectively expressed by $$D_1 = f_1 - f_2(1/m - 1)$$

$$D_2 = f_3 + f_2(1 - m)$$

The above-described optical arrangement is for the 0-diopter. Normally, in order to have a diopter of about −1 diopter used as a finder, the following relation is employed:

$$\Delta \approx -(f_3{}^2/1000) \ (<0)$$

and the third unit may be drawn by about $\Delta$ in the direction of the second unit. That is, $D_2$ may be set to $$D_2 = f_3 + f_2(1 - m) + \Delta$$

While in FIG. 5, the second unit is fixed, it is to be noted of course that other units may be moved. FIG. 6 shows the moving loci of the units 1 and 2 where the third unit is fixed.

In the finder constructed as described above, it is necessary to decrease the aperture of the finder in order to make it compact. Generally, when the magnification of the finder is increased, the aperture of the finder increases. Particularly in the case where the distance from the pupil to the first unit is greater than in a normal inverted Galilean finder, as in a zoom finder, the aperture of the finder tends to increase. In order to reduce the finder aperture, the maximum finder magnification Mmax can be decreased. In an arrangement wherein the field angle is about 52° as in the present invention, if the finder aperture of the first unit is decreased and the finder magnification is made in excess of 1, it is not possible to sufficiently increase the distance (eye relief) from the final surface of the finder to the pupil, which is unsuitable for a finder for use with a compact camera or the like. The condition (1) above is provided to that end.

As will be evident from the above described equations representative of $D_1$ and $D_2$, the focal length $f_2$ of the second unit may be decreased in order to shorten the overall length of the finder. However, if the $f_2$ is too small, various aberrations produced in the second unit increase to render good correction difficult. In order to obtain the field angle and the zoom ratio to the extent of the finder according to the present invention, the focal length of the second unit may be set to a value of about 10 mm. The condition (2) above shows the upper and lower limits thereof.

The space between the principal points of the second and third units is minimum at the minimum magnification. When thick lenses are used, these lenses come into contact with each other making it impossible to constitute a finder. However, when the space between the principal points is increased, the overall length of the finder increases.

Incidentally, if the third unit comprises, in order from an object side, an ante-component GI having a negative refracting power and a post-component GII having a positive refracting power, a principal point H on the object side of the third unit can be positioned closer to the object than the ante-component GI. Therefore, the principal point of the second unit crosses with that of the third unit but the second unit lens will not be in contact with the third unit lens.

As can be seen from FIG. 5, if the position of the principal point of the third unit can be positioned ($D_3$ is negative) on the object side beyond the position of the principal point of the second unit, the focal length $|f_3|$ of the third group may be increased to provide $$|f_1| = |M/m| \cdot |f_3|$$

from the above-described equation showing the finder magnification M. Thus, the focal length $|f_1|$ of the first unit may be decreased. Thereby various aberrations produced in the first unit are reduced to facilitate the correction of aberrations. Furthermore, it is possible to increase the focal length $|f_1|$ of the first unit without increasing the finder magnification in the entire system, and therefore, the space between the principal points of the first and second units may be decreased which is advantagous also with respect to compactness.

However, if the distance $D_2$ is negative and too great, the refracting power of the ante-component GI in the third unit increases, and aberrations produced thereat increase to render the correction of aberrations difficult. Therefore, a constant lower limit is placed on the distance $D_2$. This is also true in the case where the second unit is made to comprise a so-called retrotype which includes, in order from an object side, a negative lens system and a positive lens system, a principal point on an image side is moved in the direction of the third unit. The upper and lower limits of the condition (3) above result therefor.

In order to make a zoom finder compact, the number of lenses is preferably as low as possible. This will be advantageous also in view of cost. However, if an attempt is made to make the zoom finder compact, various aberrations produced in the first and second units are liable to increase. If an attempt is made to improve correction of aberrations with a lesser number of lenses, it is suggested that the first unit comprises two negative lenses $L_1$, $L_2$ and the second unit comprises two positive lenses $L_3$, $L_4$.

If the lens $L_1$ is designed so that a surface having a sharp curvature is faced toward a pupil side, the out-of-axial luminous fluxes may be converted gently into divergent rays and various aberrations such as astigmatism, distortion, or the like produced in the first unit may be reduced. The condition (4) above is provided to particularly obtain the effect just mentioned above.

The second unit is preferably arranged so that a surface of the lens $L_3$ having a sharp curvature is faced toward a pupil side, and a surface of the lens $L_4$ having a sharp curvature is faced toward an object side. Thereby the out-of-axial luminous fluxes incident upon the second unit as divergent rays from the first unit may be gently converted into convergent rays, and various aberrations such as astigmatism, distortion or the like produced in the second unit may be reduced. This is effective for correction of aberrations particularly when the finder magnification is great, and the condition (5) above is applied to obtain the aforesaid effect.

As previously mentioned, in the zoom finder according to the present invention, good correction of aberrations may be performed only by the spherical surface. However, in the case where a nitric material or plastic having a low refracting power is used or an attempt is made to provide a further compactness in view of reduction in cost, aberrations tend to be deteriorated, and so it is suggested that aspherical surfaces may be incorporated to effect correction of aberrations.

If in the first unit, the negative refracting power of the surface near the object is increased and the principal point is positioned on the side of the object, the space between lenses of the first and second units is reduced, which is advantageous to provide for compactness. However, in doing so, various aberrations produced in the first surface or the second surface of the lens $L_1$ increase, and particularly, a negative distortion increases. To prevent this, an aspherical surface may be used in the first surface. If a configuration is provided so that a lens surface is positioned on the pupil side from the paraxial radius of curvature as the distance from the optical axis increases, the occurrence of various aberrations is reduced, which is effective in correction of distortion particularly when the finder magnification is low. The effect similar to that of the first surface may be obtained in the second surface by use of an aspherical surface having a configuration in which a lens surface is positioned on the object side than the paraxial radius of curvature as the distance from the optical axis increases. Furthermore, if use is made in the fourth surface of an aspherical surface having a configuration in which a lens surface is positioned on the object side than the paraxial radius of curvature as the distance from the optical axis increases, various aberration produced in the fourth surface may be reduced, and particularly, an astigmatism and comatic aberration when the finder magnification is great may be prevented from being deteriorated.

Where an aspherical surface is used in the second unit, if an arrangement is provided so that as the distance from the optical axis increases, a configuration of a lens surface so as to be positioned on the object side than the paraxial radius of curvature is used for the fifth and seventh surfaces, and a configuration of a lens surface so as to be positioned on the pupil side is used for the sixth and eighth surfaces, whereby various aberrations produced in the second unit may be reduced, and an astigmatism and distortion particularly when the finder magnification is great may be effectively corrected.

When an aspherical surface is used for the ninth surface of the third unit, it is effective to minimize a difference in aberration when the finder magnification is small and large.

BRIEF DESCRIPTION OF THE DRAWINGS

FIGS. 14 to 16 show aberrations in which the magnification of the finder in Embodiment 3 is minimum, medium and maximum;

FIG. 17 shows an aberration of a frame system in Embodiment 3;

DETAILED DESCRIPTION OF THE PREFERRED EMBODIMENTS

Figure 1:
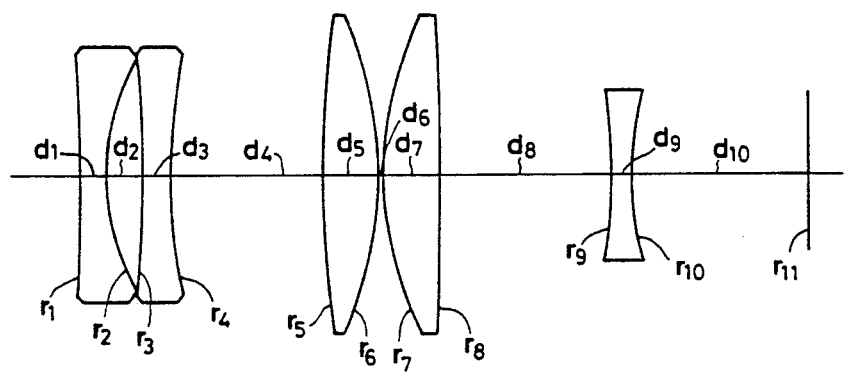
FIG. 1 is a structural view of Embodiments 1 and 2 according to the present invention.

In the following, embodiments will be described.

In the embodiments, a nitric material having a refractive index of 1.491 is an acrylic resin, and that of 1.585 is a polycarbonate resin.

In Tables, reference character r denotes the paraxial radius of curvature; d, the space between lens surfaces; n, the refractive index for d-line; K, $A_4$, $A_6$, the conical coefficient and the high-order aspherical coefficient in case the aspherical surface is represented by $$Z = \frac{1/r \, y^2}{1 + \sqrt{1 - (1 + K) \, 1/r^2 \, y^2}} + A_4 y^4 + A_6 y^6$$

where y represents the height from the optical axis; and Z represents the distance from the apex of the lens toward the optical axis.

Further, in Tables, the final surface is the pupil.

Figure 2:
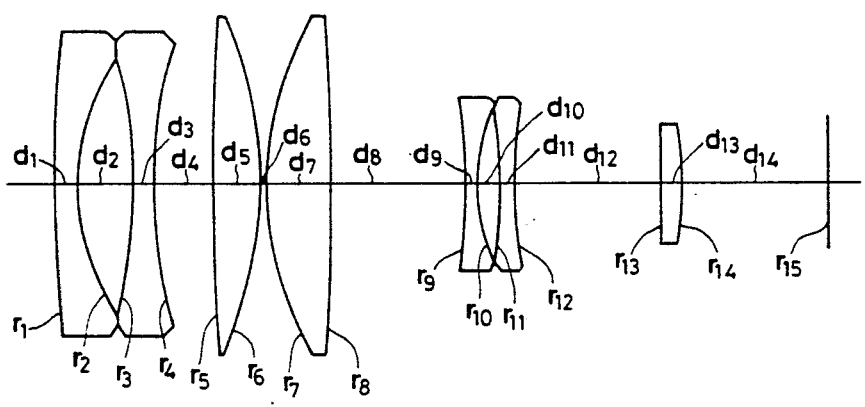
FIG. 2 is a structural view of Embodiments 3, 4, 5, 6 and 7.
Figure 3A:
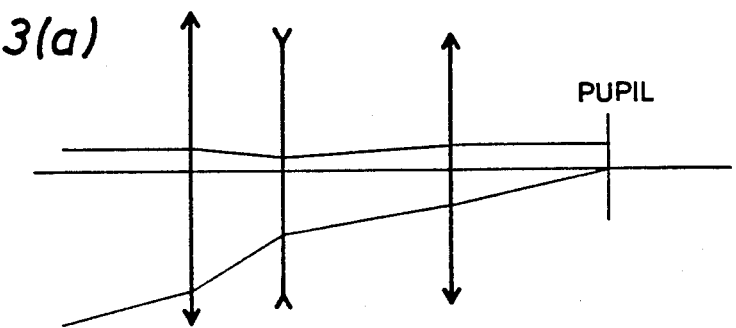
FIG. 3(a) is a schematic view of a zoom finder of a positive-negative-positive type.
Figure 3B:
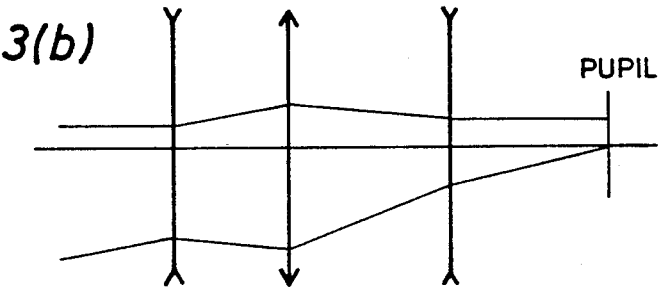
FIG. 3(b) is a schematic view of a zoom finder of a negative-positive-negative type.
Figure 4:
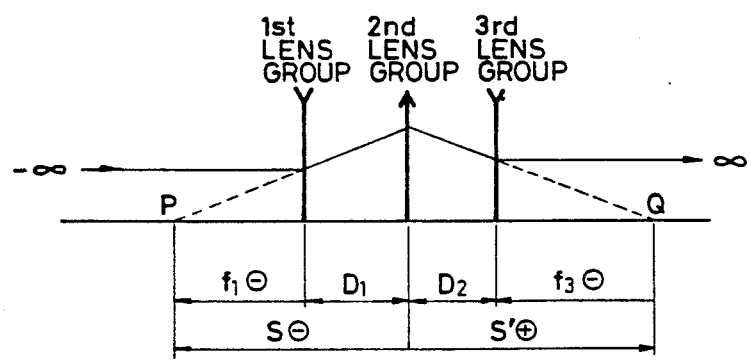
FIG. 4 is a view for explanation of the negative-positive-negative type.
Figure 5:
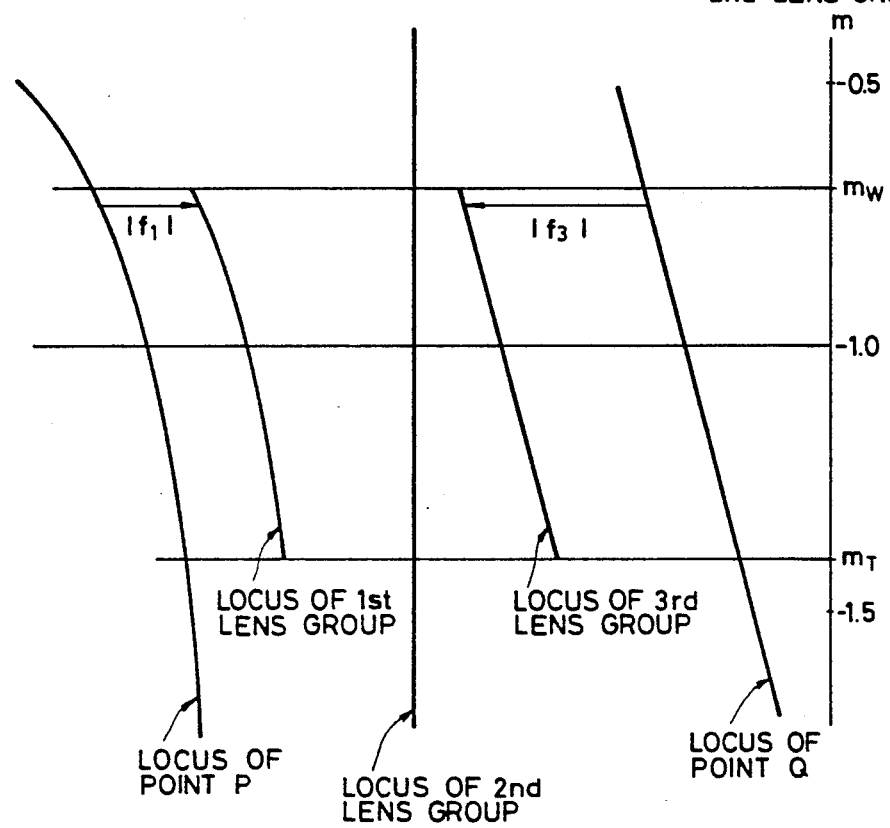
FIG. 5 is a view for explanation of changes in positions of respective units.
Figure 6:
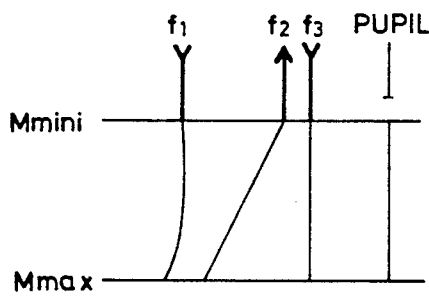
FIG. 6 is a moving view of respective units when the third unit is fixed.
Figure 7:
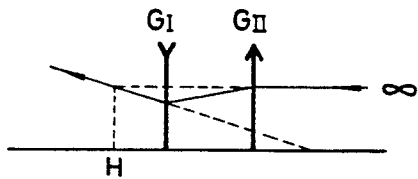
FIG. 7 is a view for explanation in which the third unit is composed of a negative ante-component and a positive post-component.
Figure 8:
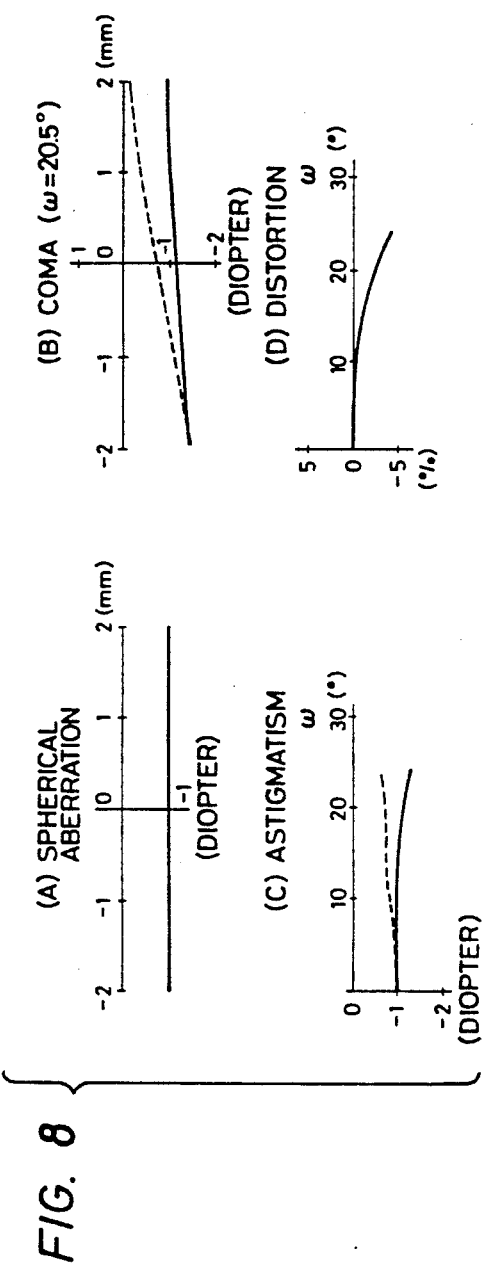
FIGS. 8 to 10 show aberrations in which the magnification of the finder in Embodiment 1 is minimum, medium and maximum.
Figure 9:
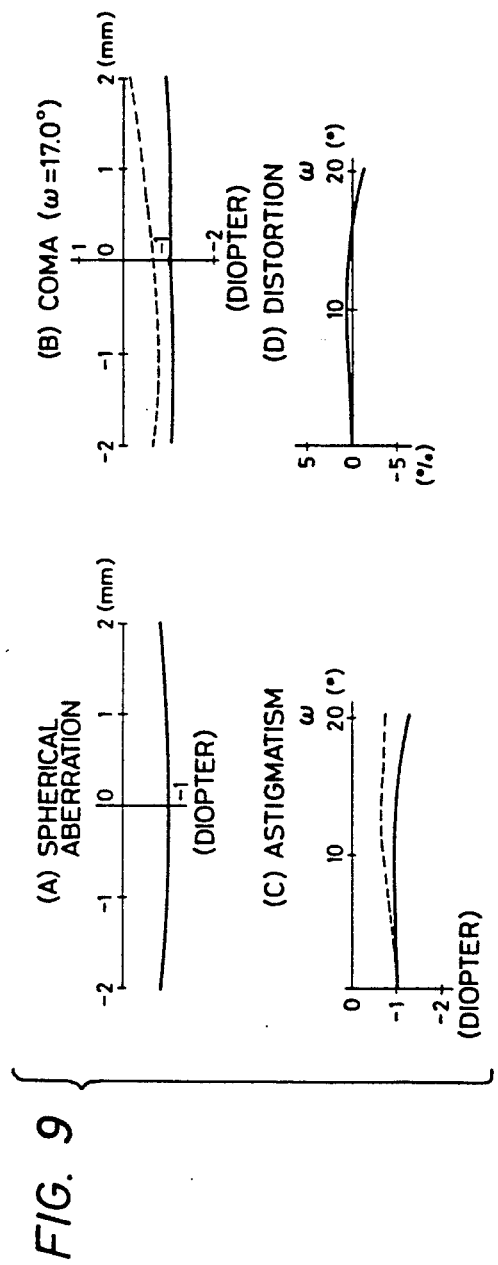
Figure 10:
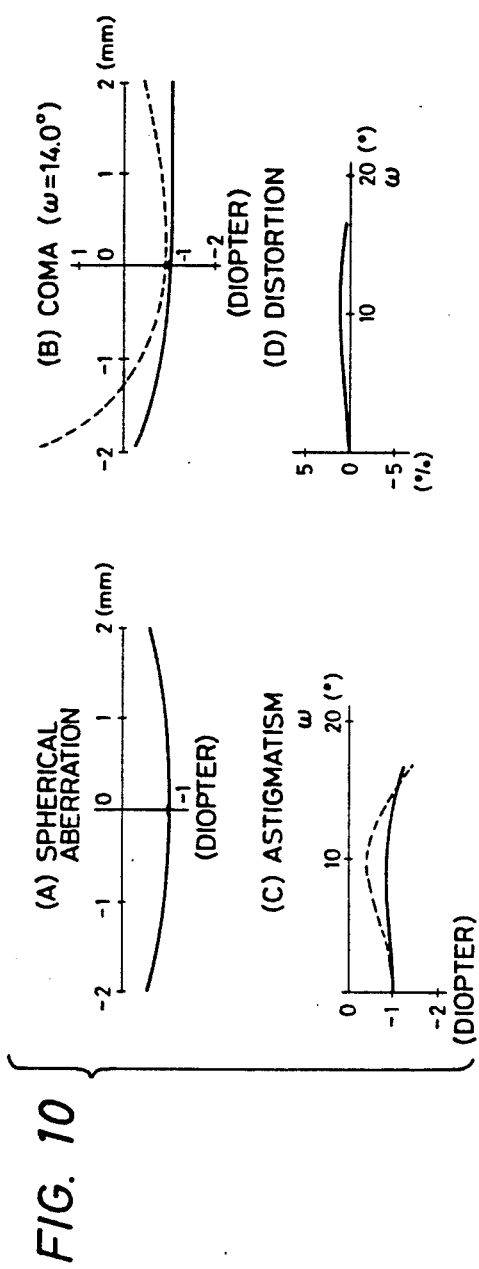
Figure 11:
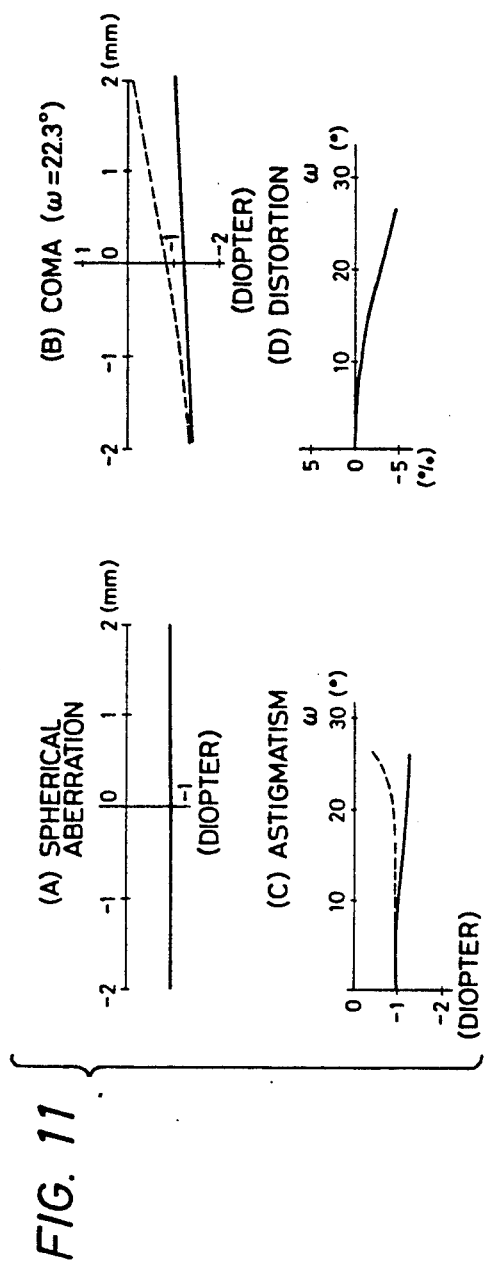
FIGS. 11 to 13 show aberrations in which the magnification of the finder in Embodiment 2 is minimum, medium and maximum.
Figure 12:
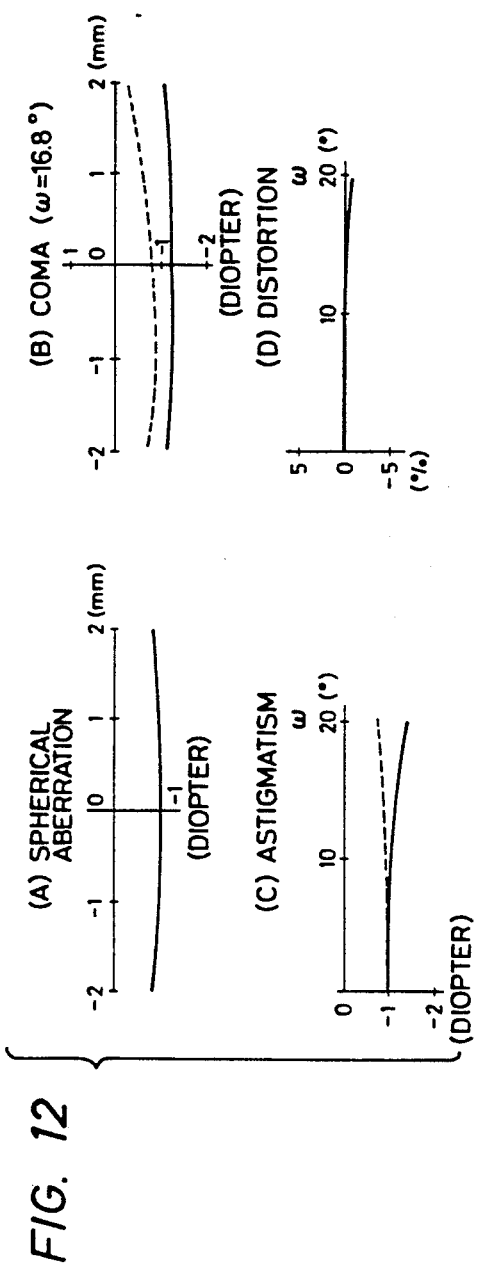
Figure 13:
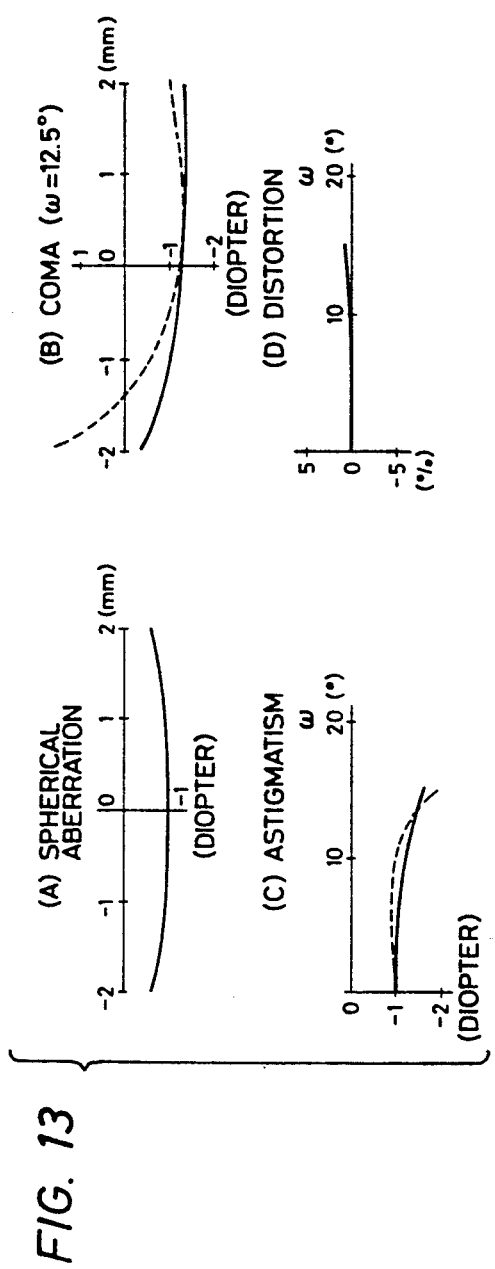
Figure 18:
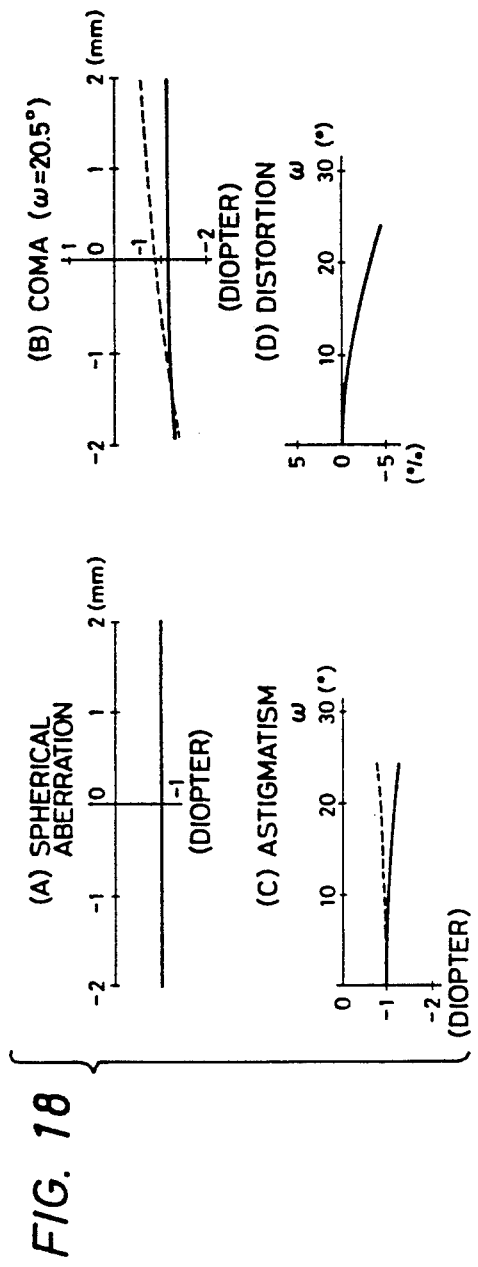
FIGS. 18 to 20 show aberrations in which the magnification of the finder in Embodiment 4 is minimum, medium and maximum.
Figure 19:
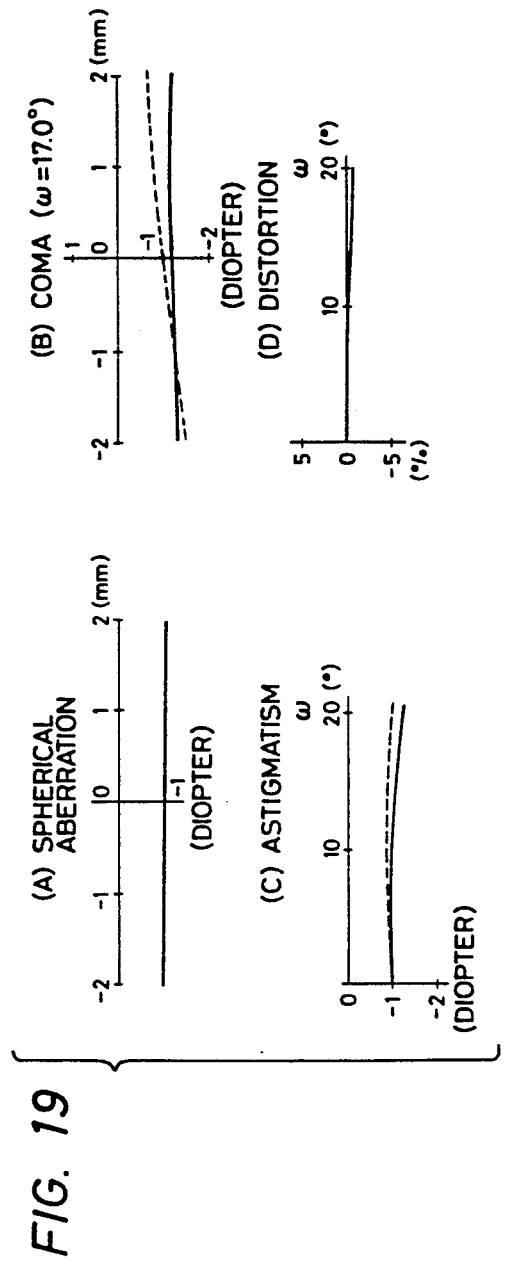
Figure 20:
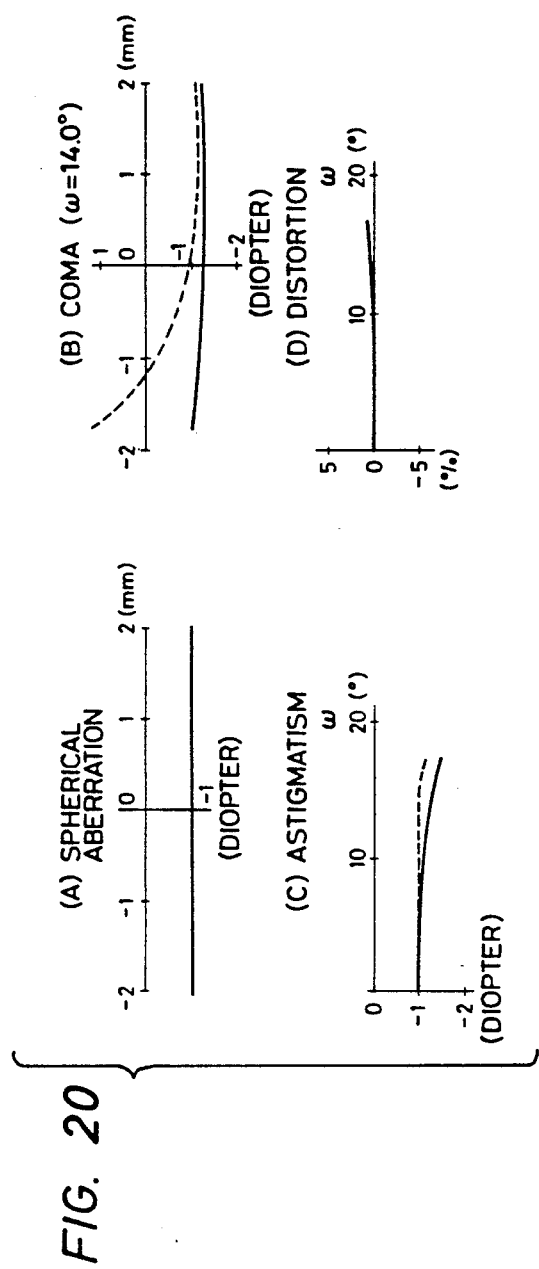
Figure 21:
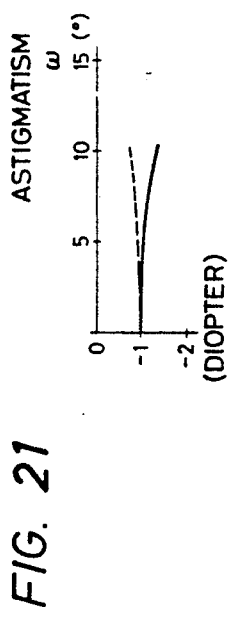
FIG. 21 shows an aberration of a frame system in Embodiment 4.
Figure 22:
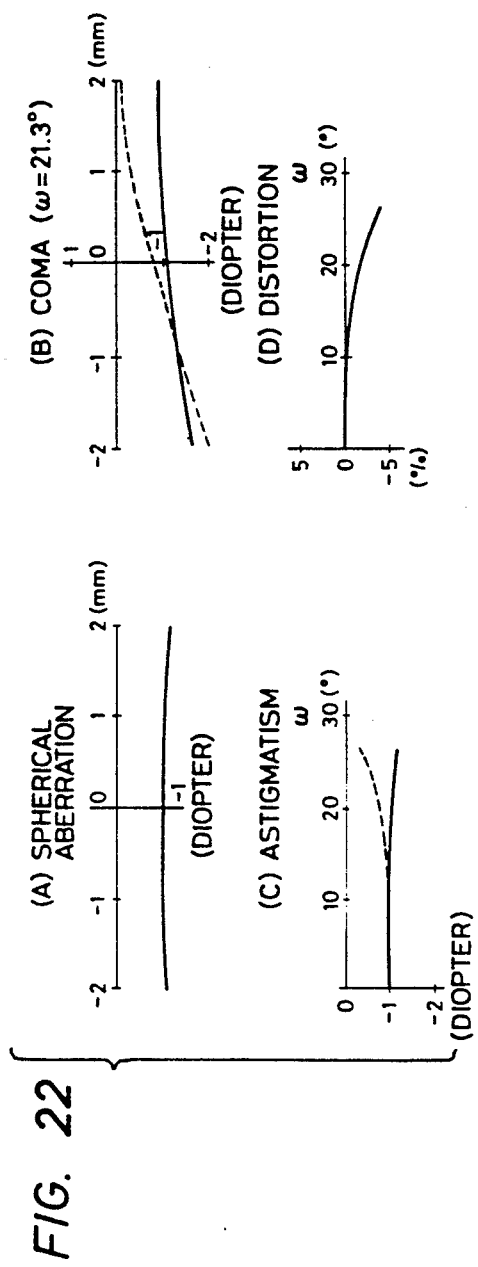
FIGS. 22 to 24 show aberrations in which the magnification of the finder in Embodiment 5 is minimum, medium and maximum.
Figure 23:
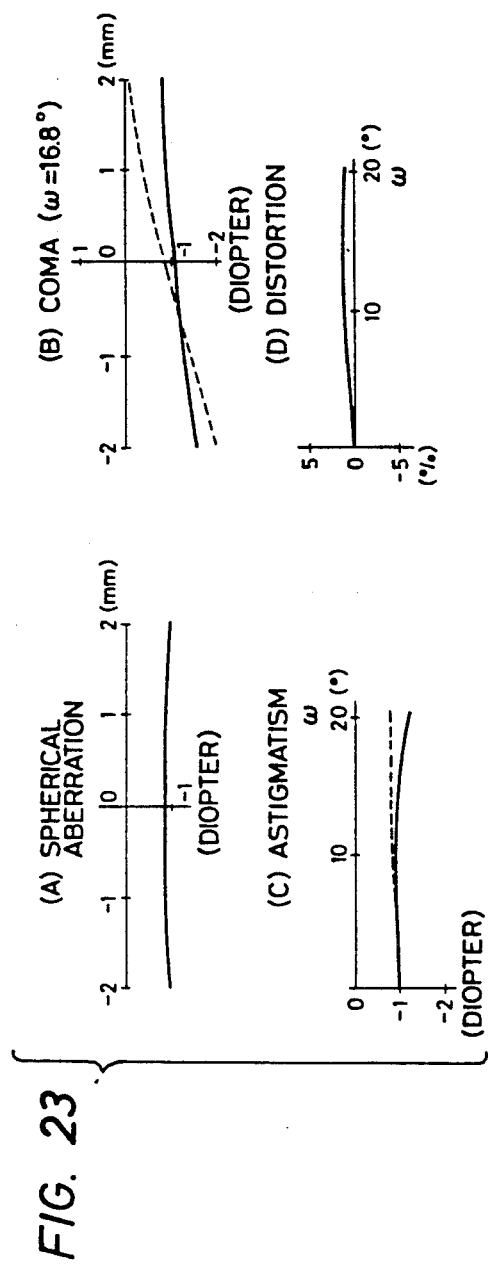
Figure 24:
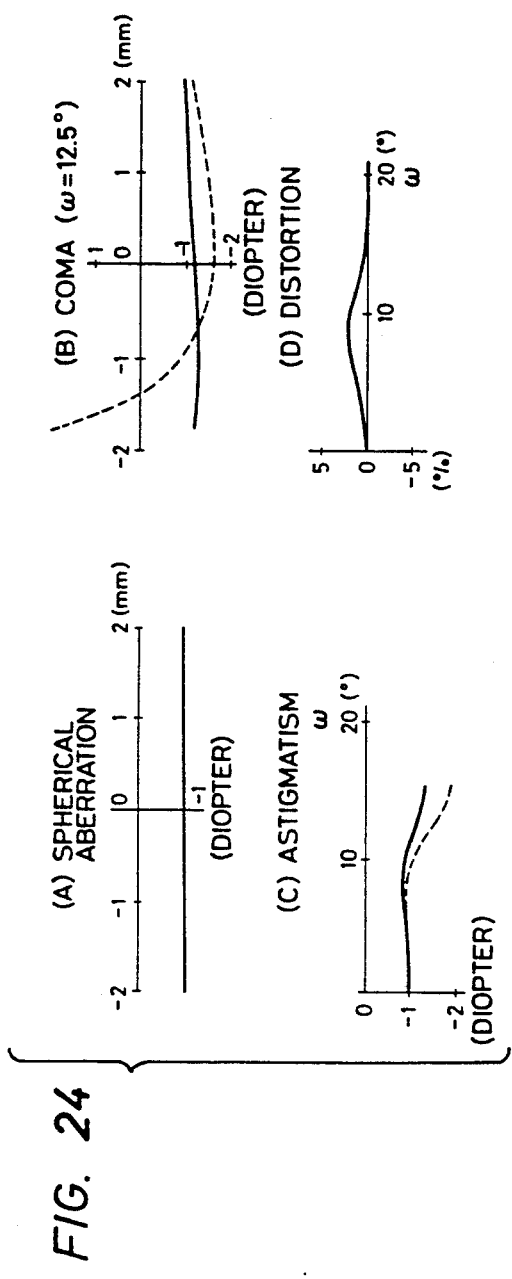
Figure 25:
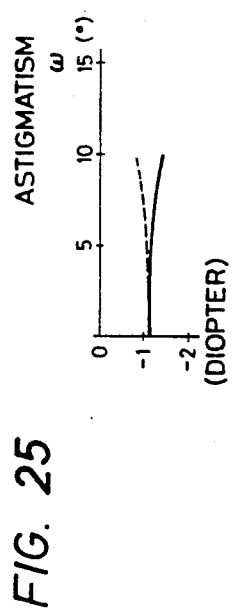
FIG. 25 shows an aberration of a frame system in Embodiment 5.
Figure 26:
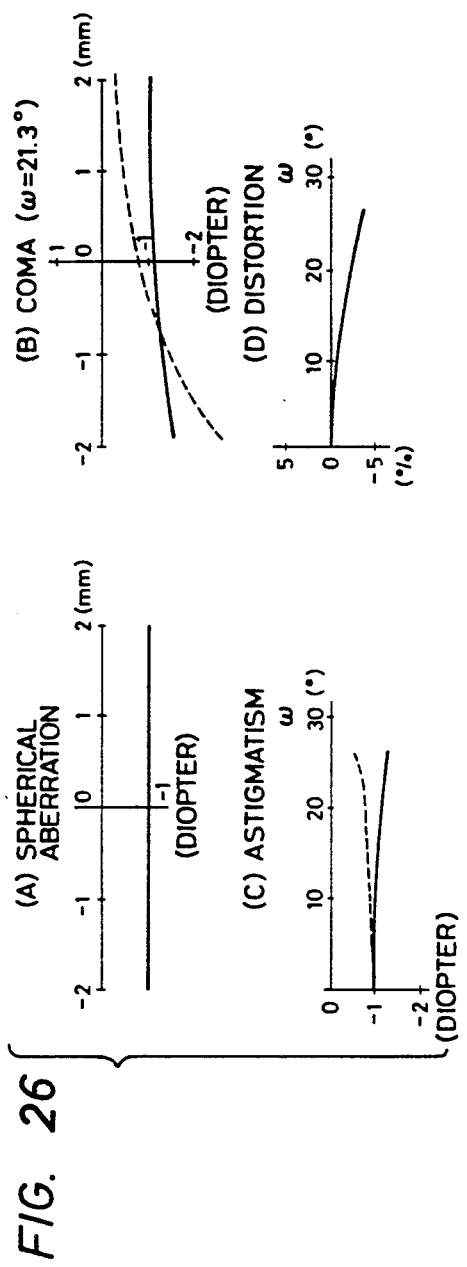
FIGS. 26 to 28 show aberrations in which the magnification of the finder in Embodiment 6 is minimum, medium and maximum.
Figure 27:
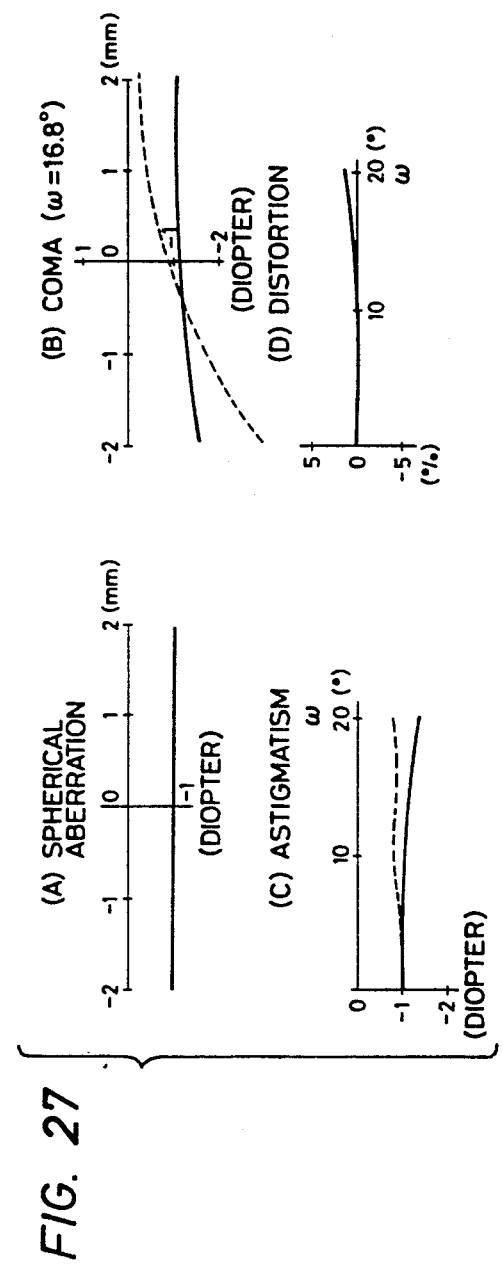
Figure 28:
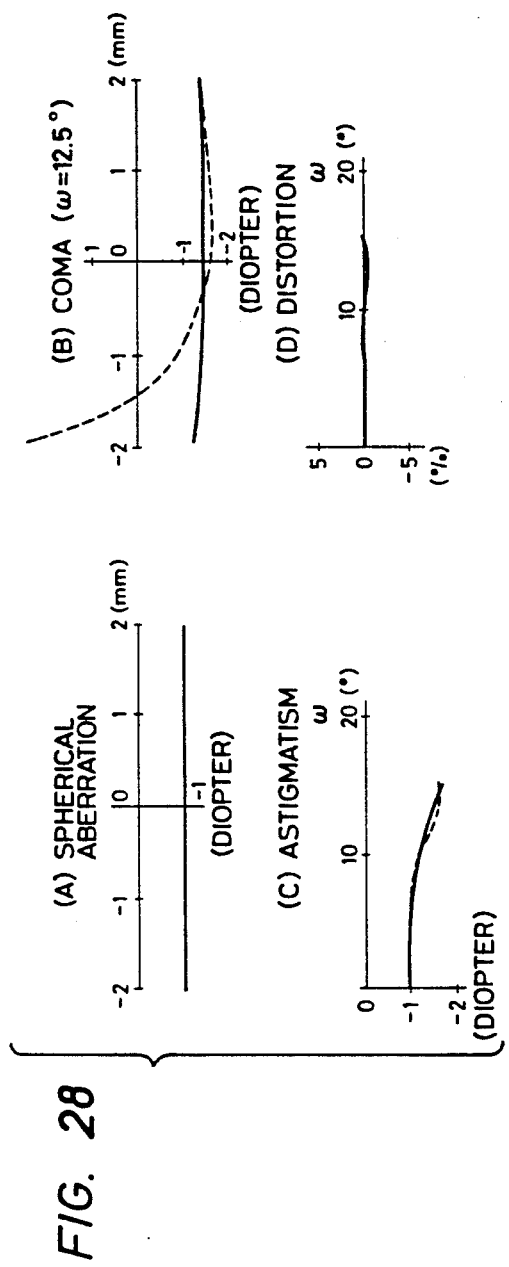
Figure 29:
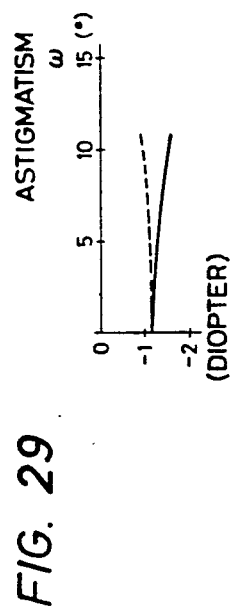
FIG. 29 shows an aberration of a frame system in Embodiment 6.
Figure 30:
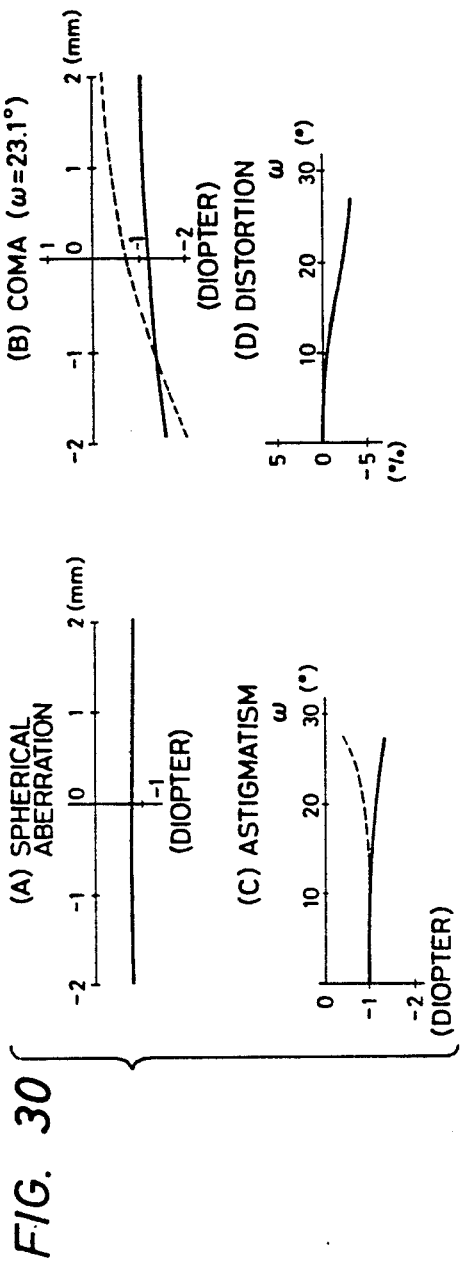
FIGS. 30 to 32 show aberrations in which the magnification of the finder in Embodiment 7 is minimum, medium and maximum.
Figure 31:
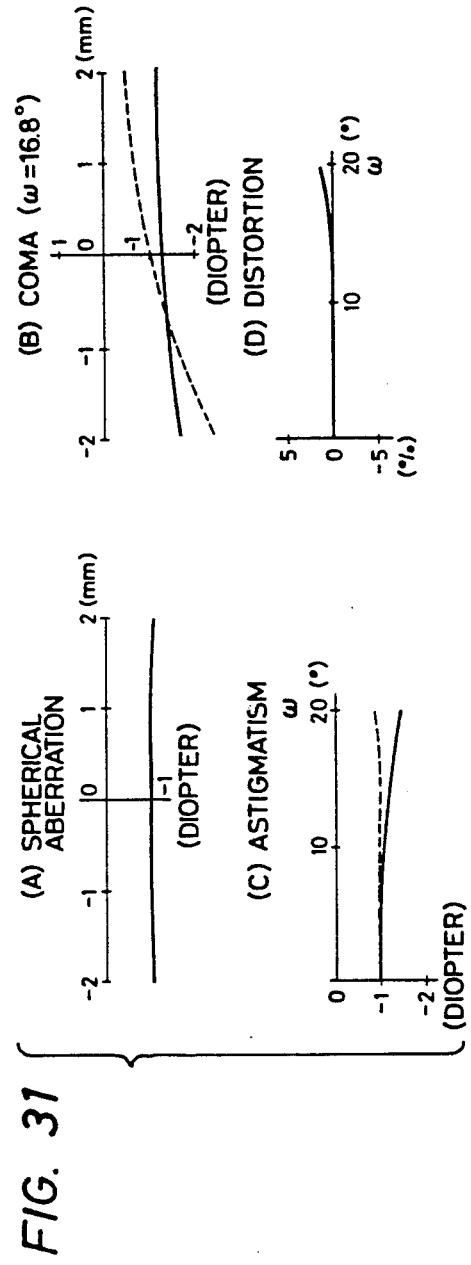
Figure 32:
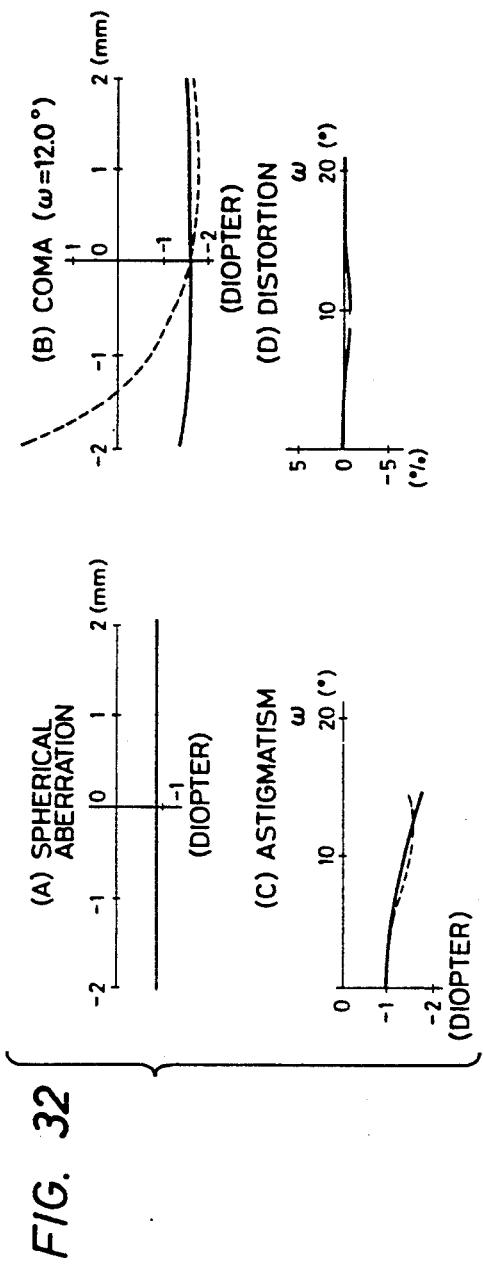
Figure 33:
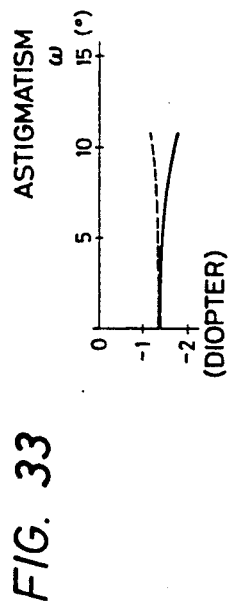
FIG. 33 shows an aberration of a frame system in Embodiment 7.

Embodiments 1 and 2 employ a lens construction shown in FIG. 1 in which the third unit comprises a double-convex single lens. Embodiments 3 through 7 employ a lens construction shown in FIG. 2, in which the 9th to 12th surfaces are the ante-component GI, the 13th to 14th surfaces are the post-component GII, the 12th surface being a half mirror, the 13th surface being provided with a frame to form a frame system. By the provision of the frame system in the third unit, the visual field is changed in size as zooming proceeds but the size of the frame is maintained constant.

Embodiment 3 is an example which is composed of merely spherical surfaces. The 12th surface is formed into an aspherical surface as in Embodiments 4 to 7, and a configuration is provided so that a lens surface is positioned on the object side than the paraxial radius of curvature, whereby the astigmatism of the frame system may be well corrected.

Embodiment 1

Field angle $2\omega = -33.4°-48.5°$
Finder - magnification $M = 0.44-0.65$
Zoom ratio × 1.5    Finder - diopter    $-1.04$ diopter

| Dwg. No. | r | d | n |
|---|---|---|---|
| 1 | −174.149 | 1.7 | 1.491 |
| 2 | 10.354 | 2.13 | |
| 3 | −42.278 | 1.7 | 1.585 |
| 4 | 21.733 | $d_4$ | |
| 5 | 68.861 | 3.4 | 1.491 |
| 6 | −16.287 | 0.15 | |
| 7 | 14.988 | 3.5 | 1.58913 |
| 8 | −284.196 | $d_8$ | |
| 9 | −36.321 | 1.5 | 1.491 |
| 10 | 12.366 | 13.0 | |
| 11 | ∞ | | |

| Dwg. No. | K | $A_4$ |
|---|---|---|
| 1 | −7348.7288 | $-1.681488 \times 10^{-5}$ |
| 4 | −0.59832 | $6.331871 \times 10^{-6}$ |
| 5 | −27.731714 | $-3.143541 \times 10^{-6}$ |
| 9 | −1.257888 | $5.770896 \times 10^{-6}$ |

| | $M = 0.435$ | $M = 0.533$ | $M = 0.653$ |
|---|---|---|---|
| $d_4$ | 14.569 | 11.647 | 9.262 |
| $d_8$ | 1.462 | 3.848 | 6.769 |

$f_2 = 13.0$    $Dw = 4.64$

Embodiment 2

Field angle $2\omega = 30°-52.6°$
Finder - magnification $M = 0.41-0.75$
Zoom ratio × 1.85    Finder - diopter    $-1.0$ diopter

| Dwg. No. | r | d | n |
|---|---|---|---|
| 1 | −191.722 | 1.7 | 1.491 |
| 2 | 10.81 | 2.6 | |
| 3 | −49.842 | 1.7 | 1.491 |
| 4 | 29.785 | $d_4$ | |
| 5 | 53.052 | 3.75 | 1.491 |
| 6 | −21.082 | 0.15 | |
| 7 | 16.872 | 3.95 | 1.491 |
| 8 | −180.215 | $d_8$ | |
| 9 | −31.998 | 1.5 | 1.491 |
| 10 | 16.787 | 12.0 | |
| 11 | ∞ | | |

| Dwg. No. | K | $A_4$ |
|---|---|---|
| 2 | −0.196027 | $-2.219476 \times 10^{-5}$ |
| 4 | −0.624045 | $-6.02606 \times 10^{-6}$ |
| 5 | −7.229509 | $-3.151942 \times 10^{-6}$ |
| 8 | −56.14343 | $2.31673 \times 10^{-6}$ |
| 9 | −2.612429 | $9.197489 \times 10^{-6}$ |

| | $M = 0.406$ | $M = 0.551$ | $M = 0.749$ |
|---|---|---|---|
| $d_4$ | 20.204 | 14.464 | 10.240 |
| $d_8$ | 1.410 | 5.634 | 11.374 |

$f_2 = 16.0$    $Dw = 5.07$

Embodiment 3

Field angle $2\omega = 33.4°-48.5°$
Finder - magnification $M = 0.42-0.62$
Zoom ratio × 1.5    Finder - diopter    $-0.99$ diopter

| Dwg. No. | r | d | n |
|---|---|---|---|
| 1 | 99.574 | 1.7 | 1.491 |
| 2 | 14.127 | 4.0 | |
| 3 | −35.244 | 1.7 | 1.491 |
| 4 | 29.067 | $d_4$ | |
| 5 | 331.573 | 3.6 | 1.62299 |
| 6 | −23.045 | 0.12 | |
| 7 | 18.074 | 4.9 | 1.65844 |
| 8 | −81.377 | $d_8$ | |
| 9 | −39.019 | 1.3 | 1.585 |
| 10 | 14.184 | 1.5 | |
| 11 | −43.528 | 1.3 | 1.491 |
| 12 | 39.32 | 12.0 | |
| 13 | | 1.8 | 1.491 |
| 14 | −23.199 | 12.0 | |
| 15 | ∞ | | |

| | $M = 0.416$ | $M = 0.51$ | $M = 0.624$ |
|---|---|---|---|
| $d_4$ | 10.6 | 7.453 | 4.884 |
| $d_8$ | 1.522 | 4.091 | 7.238 |

$f_2 = 14.0$    $Dw = -3.41$    No aspherical surface
Frame diopter    $-1.63$ diopter

Embodiment 4

Field angle $2\omega = 33.4°-48.5°$
Finder - magnification $M = 0.42-0.62$
Zoom ratio × 1.5    Finder - diopter    $-0.99$ diopter

| Dwg. No. | r | d | n |
|---|---|---|---|
| 1 | 680.564 | 1.7 | 1.585 |
| 2 | 17.503 | 3.5 | |
| 3 | −41.199 | 1.7 | 1.585 |
| 4 | 41.381 | $d_4$ | |
| 5 | 320.376 | 4.0 | 1.585 |
| 6 | −21.069 | 0.12 | |
| 7 | 16.808 | 5.1 | 1.585 |
| 8 | −61.771 | $d_8$ | |
| 9 | −29.409 | 1.3 | 1.585 |
| 10 | 17.488 | 1.3 | |
| 11 | −43.818 | 1.3 | 1.585 |
| 12 | 38.75 | 11.8 | |
| 13 | ∞ | 1.8 | 1.491 |
| 14 | −21.191 | 12.0 | |
| 15 | ∞ | | |

| Dwg. No. | K | $A_4$ |
|---|---|---|
| 1 | 272.73013 | $2.849799 \times 10^{-6}$ |
| 2 | −3.929281 | $2.078392 \times 10^{-6}$ |
| 6 | −0.435402 | $8.34621 \times 10^{-7}$ |
| 8 | −16.180992 | $1.747715 \times 10^{-6}$ |
| 9 | −3.903197 | $-3.245442 \times 10^{-7}$ |
| 12 | −1.85 | 0.0 |

| | $M = 0.416$ | $M = 0.51$ | $M = 0.625$ |
|---|---|---|---|
| $d_4$ | 10.2 | 7.053 | 4.484 |
| $d_8$ | 1.491 | 4.06 | 7.207 |

$f_2 = 14.0$    $Dw = -3.41$
Frame diopter    $-1.02$ diopter

Embodiment 5

Field angle $2\omega = 30°-52.6°$
Finder - magnification $M = 0.34-0.63$
Zoom ratio × 1.85    Finder - diopter    $-1.0$ diopter

| Dwg. No. | r | d | n |
|---|---|---|---|
| 1 | −426.641 | 1.7 | 1.585 |
| 2 | 14.846 | 4.05 | |
| 3 | −28.022 | 1.7 | 1.491 |
| 4 | 51.547 | $d_4$ | |
| 5 | 858.599 | 3.65 | 1.6968 |
| 6 | −26.043 | 0.12 | |
| 7 | 23.157 | 5.0 | 1.713 |
| 8 | −135.410 | $d_8$ | |
| 9 | −56.019 | 1.3 | 1.491 |
| 10 | 10.665 | 1.55 | |
| 11 | −3138.185 | 1.3 | 1.491 |
| 12 | 38.0 | 11.8 | |
| 13 | ∞ | 1.8 | 1.491 |
| 14 | −23.618 | 12.0 | |

-continued

| | 15 | ∞ | |
|---|---|---|---|

| Dwg. No. | K | $A_4$ | $A_6$ |
|---|---|---|---|
| 1 | −88767.508 | $2.050268 \times 10^{-6}$ | 0.0 |
| 9 | 14.640494 | $-1.086817 \times 10^{-5}$ | $3.793458 \times 10^{-7}$ |
| 12 | −0.92 | 0.0 | 0.0 |
| | M = 0.342 | M = 0.465 | M = 0.632 |
| $d_4$ | 12.631 | 8.406 | 5.297 |
| $d_8$ | 1.436 | 7.176 | 14.975 |

| $f_2$ = 16.0 | Dw = −5.96 |
|---|---|
| Frame diopter | −1.14 diopter |

Embodiment 6

Field angle $2\omega$ = 30°−52.6°
Finder - magnification M = 0.39−0.72

| Zoom ratio × 1.85 | Finder - diopter | −1.0 diopter | |
|---|---|---|---|
| Dwg. No. | r | d | n |
| 1 | 166.937 | 1.7 | 1.585 |
| 2 | 16.254 | 4.65 | |
| 3 | −35.488 | 1.7 | 1.491 |
| 4 | 38.052 | $d_4$ | |
| 5 | 197.339 | 3.95 | 1.713 |
| 6 | −26.916 | 0.12 | |
| 7 | 19.955 | 5.35 | 1.713 |
| 8 | −378.114 | $d_8$ | |
| 9 | −42.573 | 1.3 | 1.491 |
| 10 | 12.621 | 1.6 | |
| 11 | −34.882 | 1.3 | 1.491 |
| 12 | 37.440 | 11.8 | |
| 13 | ∞ | 1.8 | 1.491 |
| 14 | −24.126 | 12.0 | |
| 15 | ∞ | | |

| Dwg. No. | K | $A_4$ | $T_6$ |
|---|---|---|---|
| 1 | 137.0039 | $9.793942 \times 10^{-7}$ | 0.0 |
| 9 | −0.724112 | $7.45083 \times 10^{-7}$ | $-1.623024 \times 10^{-7}$ |
| 12 | −1.12 | 0.0 | 0.0 |
| | M = 0.39 | M = 0.529 | M = 0.719 |
| $d_4$ | 14.167 | 8.786 | 4.826 |
| $d_8$ | 1.387 | 5.348 | 10.729 |

| $f_2$ = 15.0 | Dw = −2.27 |
|---|---|
| Frame diopter | −1.17 diopter |

Embodiment 7

Field angle $2\omega$ = 28.8°−54.4°
Finder - magnification M = 0.37−0.74

| Zoom ratio × 2.0 | Finder diopter | −0.99 diopter | |
|---|---|---|---|
| Dwg. No. | r | d | n |
| 1 | 55.664 | 1.7 | 1.585 |
| 2 | 15.630 | 5.25 | |
| 3 | −32.785 | 1.7 | 1.491 |
| 4 | 35.831 | $d_4$ | |
| 5 | 705.054 | 3.85 | 1.713 |
| 6 | −27.392 | 0.12 | |
| 7 | 20.891 | 5.4 | 1.7433 |
| 8 | 586.056 | $d_8$ | |
| 9 | −37.212 | 1.3 | 1.491 |
| 10 | 13.945 | 1.6 | |
| 11 | −66.245 | 1.3 | 1.585 |
| 12 | 36.450 | 11.8 | |
| 13 | ∞ | 1.8 | 1.491 |
| 14 | 24.369 | 12.0 | |
| 15 | ∞ | | |

| Dwg. No. | K | $A_4$ | $A_6$ |
|---|---|---|---|
| 1 | 9.889983 | $-1.167172 \times 10^{-6}$ | 0.0 |
| 4 | −0.419158 | $-9.418434 \times 10^{-7}$ | $-1.40527 \times 10^{-8}$ |
| 9 | −0.136811 | $-1.826967 \times 10^{-6}$ | 0.0 |
| 12 | −0.95 | 0.0 | 0.0 |
| | M = 0.37 | M = 0.523 | M = 0.74 |
| $d_4$ | 17.353 | 10.601 | 5.827 |
| $d_8$ | 1.397 | 6.171 | 12.922 |

| $f_2$ = 16.3 | Dw = −2.82 |
|---|---|

-continued

| Frame diopter | −1.34 diopter |
|---|---|

In accordance with the present invention, it is possible to obtain a zoom finder well corrected in various aberrations as shown in FIGS. 8 to 33 which show aberrations in the respective embodiments. In the drawings, A represents the spherical aberration with respect to the incident height to the pupil in diopter, and B likewise represents the comatic aberration with respect to the incident height to the pupil, the solid line showing the sagital coma and the broken line showing the meridional coma. C represents the astigmatism with respect to the field angle of the incident rays in diopter, the solid line showing the sagital astigmatism and the broken line showing the meridional astigmatism. D represents the distortion with respect to the field angle of the incident rays.

FIGS. 17, 21, 25, 29 and 33 respectively show the astigmatisms of the frame systems in Embodiments 3, 4, 5, 6 and 7 with respect to the field angle incident upon the pupil in diopter, the solid line showing the sagital astigmatism and the broken line showing the meriodional astigmatism.

As will be evident from the respective Embodiments, many plastic lenses are used to realize the reduction in cost.

What is claimed is:

1. A zoom finder including, in order from an object side, a first unit having a negative refracting power, a second unit having a positive refracting power and a third unit having a negative refracting power, wherein a space between the first unit and the second unit and a space between the second unit and the third unit are relatively varied to vary the magnification of the finder, the zoom finder fulfilled by the following conditions:

$$Mmax < 1; \text{ and}$$

$$10 < f_2 < 20;$$

where:
Mmax is a maximum magnification of the finder; and $f_2$ is a focal length of the second unit.

2. A zoom finder according to claim 1, wherein the finder is fulfilled by the following condition:

$$-10 < Dw < 10;$$

where:
Dw is the space between principal points of the second and third units at the minimum magnification of the finder.

3. A zoom finder according to claim 2, wherein the finder is fulfilled by the following condition:

$$-10 < Dw < 10;$$

where:
Dw is the space between principal points between the second and third units at the minimum magnification of the finder.

4. A zoom finder according to claim 1, wherein the third unit is composed of an ante-component having a negative refracting power and a post-component having a positive refracting power.

5. A zoom finder according to claim 4, wherein one surface in the ante-component of the third unit comprises a half mirror, and a frame is formed in one surface of the post-component to provide for an albada finder.

6. A zoom finder according to claim 1, wherein the first unit comprises a negative lens $L_1$ and a negative lens $L_2$ with a surface having a sharp curvature faced to a pupil side; and the finder is fulfilled by the following condition:

$$r_2 < 0.4 |r_1|;$$

where:
- $r_1$ is the paraxial radius of curvature on the object side of the lens $L_1$; and
- $r_2$ is the paraxial radius of curvature on the pupil side of the lens $L_1$.

7. A zoom finder according to claim 6, wherein the first surface of the lens $L_1$ is formed into an aspherical surface such that the lens surface is to be positioned on the pupil side than the spherical surface having the paraxial radius of curvature as the distance from the optical axis increases.

8. A zoom finder according to claim 6, wherein the second surface of the lens $L_1$ is formed into an aspherical surface such that the lens surface is to be positioned on the object side than the spherical surface having the paraxial radius of curvature as the distance from the optical axis increases.

9. A zoom finder according to claim 6, wherein the fourth surface of the lens $L_2$ is formed into an aspherical surface such that the lens surface is to be positioned on the object side than the spherical surface having the paraxial radius of curvature as the distance from the optical axis increases.

10. A zoom finder according to claim 1, wherein the second unit comprises a positive lens $L_3$ with a surface having a sharp curvature faced toward the pupil and a positive lens $L_4$ with a surface having a sharp curvature faced to the object side; and the finder is fulfilled by the following condition:

$$r_7 < 0.4 |r_8|;$$

where:
- $r_7$ is the paraxial radius of curvature of the surface on the object side of the lens $L_4$ in the second unit, and
- $r_8$ is the paraxial radius of curvature of the surface on the pupil side of the lens $L_4$.

11. A zoom finder according to claim 6, wherein in the second unit, the fifth and seventh surfaces are formed into an aspherical surface such that the lens surface is to be positioned on the object side than the spherical surface having the paraxial radius of curvature whereas the sixth and eighth surfaces are formed into an aspherical surface such that the lens surface is to be positioned on the pupil side, as the distance from the optical axis increases.

12. A zoom finder according to claim 2, wherein in the third unit, the ninth surface is formed into an aspherical surface.

13. A zoom finder according to claim 1, wherein the second unit is fixed, and the first and third units are moved to perform zooming.

14. A zoom finder according to claim 1, wherein the third unit is fixed, and the first and second units are moved to perform zooming.

* * * * *